(12) United States Patent
Saini

(10) Patent No.: US 9,001,086 B1
(45) Date of Patent: Apr. 7, 2015

(54) DISPLAY ILLUMINATION WITH LIGHT-BASED TOUCH SENSING

(75) Inventor: Amrinder Pal Singh Saini, Union City, CA (US)

(73) Assignee: Amazon Technologies, Inc., Reno, NV (US)

( * ) Notice: Subject to any disclaimer, the term of this patent is extended or adjusted under 35 U.S.C. 154(b) by 747 days.

(21) Appl. No.: 13/169,886

(22) Filed: Jun. 27, 2011

Related U.S. Application Data

(60) Provisional application No. 61/494,769, filed on Jun. 8, 2011.

(51) Int. Cl.
G06F 3/042 (2006.01)

(52) U.S. Cl.
CPC .................................. G06F 3/0428 (2013.01)

(58) Field of Classification Search
CPC ..... G06F 3/0421; G06F 3/042; G06F 3/0412; G06F 3/0428; G06F 2203/04109; G02F 1/13338; G02F 2001/133616; B29D 11/00673
USPC .......................................................... 345/175
See application file for complete search history.

(56) References Cited

U.S. PATENT DOCUMENTS

| | | | |
|---|---|---|---|
| 6,540,392 B1 * | 4/2003 | Braithwaite | 362/572 |
| 7,880,732 B2 | 2/2011 | Goertz | |
| 8,130,210 B2 * | 3/2012 | Saxena et al. | 345/175 |
| 2004/0114396 A1 * | 6/2004 | Kobayashi et al. | 362/561 |
| 2005/0151716 A1 * | 7/2005 | Lin | 345/102 |
| 2005/0243070 A1 * | 11/2005 | Ung et al. | 345/176 |
| 2006/0114244 A1 * | 6/2006 | Saxena et al. | 345/175 |
| 2007/0024598 A1 * | 2/2007 | Miller et al. | 345/175 |
| 2007/0273714 A1 * | 11/2007 | Hodge et al. | 345/690 |
| 2008/0278460 A1 * | 11/2008 | Arnett et al. | 345/175 |
| 2010/0271334 A1 * | 10/2010 | Yuan | 345/175 |
| 2010/0283718 A1 * | 11/2010 | Choi et al. | 345/102 |
| 2011/0122075 A1 * | 5/2011 | Seo et al. | 345/173 |
| 2011/0163998 A1 * | 7/2011 | Goertz et al. | 345/175 |
| 2011/0169781 A1 * | 7/2011 | Goertz et al. | 345/175 |
| 2011/0199338 A1 * | 8/2011 | Kim | 345/175 |
| 2012/0098794 A1 * | 4/2012 | Kleinert et al. | 345/175 |
| 2013/0257810 A1 * | 10/2013 | Niu et al. | 345/175 |

* cited by examiner

*Primary Examiner* — Dorothy Harris
(74) *Attorney, Agent, or Firm* — Lee & Hayes, PLLC

(57) ABSTRACT

Some implementations include a light-based touch sensing system in which a first type of light is projected across a display surface for detection by one or more light sensors. When a user's finger blocks the light from being delivered to a light sensor, a location of the finger with respect to the display can be determined. At least one light source may be selectively operable to emit a second type of light, different from the first type of light, to illuminate the display surface with visible light. In some implementations, a dual-mode light source is selectively operable to emit the first type of light, the second type of light, or both the first type and second type of light. In other implementations, a first light source emits the first type of light and a second light source emits the second type of light through the same light guide.

27 Claims, 16 Drawing Sheets

DISPLAY ILLUMINATION WITH LIGHT-BASED TOUCH SENSING

CROSS-REFERENCE TO RELATED APPLICATION

This application claims the benefit of U.S. Provisional Application No. 61/494,769, filed Jun. 8, 2011, the entire disclosure of which is incorporated by reference herein.

BACKGROUND

People commonly use electronic devices for communicating with others, consuming digital media content, executing applications, and performing numerous other functions. Examples of such electronic devices may include eBook reader devices, cellular telephones and smart phones, tablet computers, portable media players, laptop and netbook computers, personal digital assistants, and navigation devices, to name a few. These electronic devices typically have a display for displaying information, media content, user interfaces, and the like. Some of these electronic devices also include touch screen displays that enable a user to use one or more fingers to interact with images rendered on the display, such as for controlling functions of the electronic device. However, users continue to seek devices with additional display configurations and physical capabilities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Display Illumination

Figure 1:
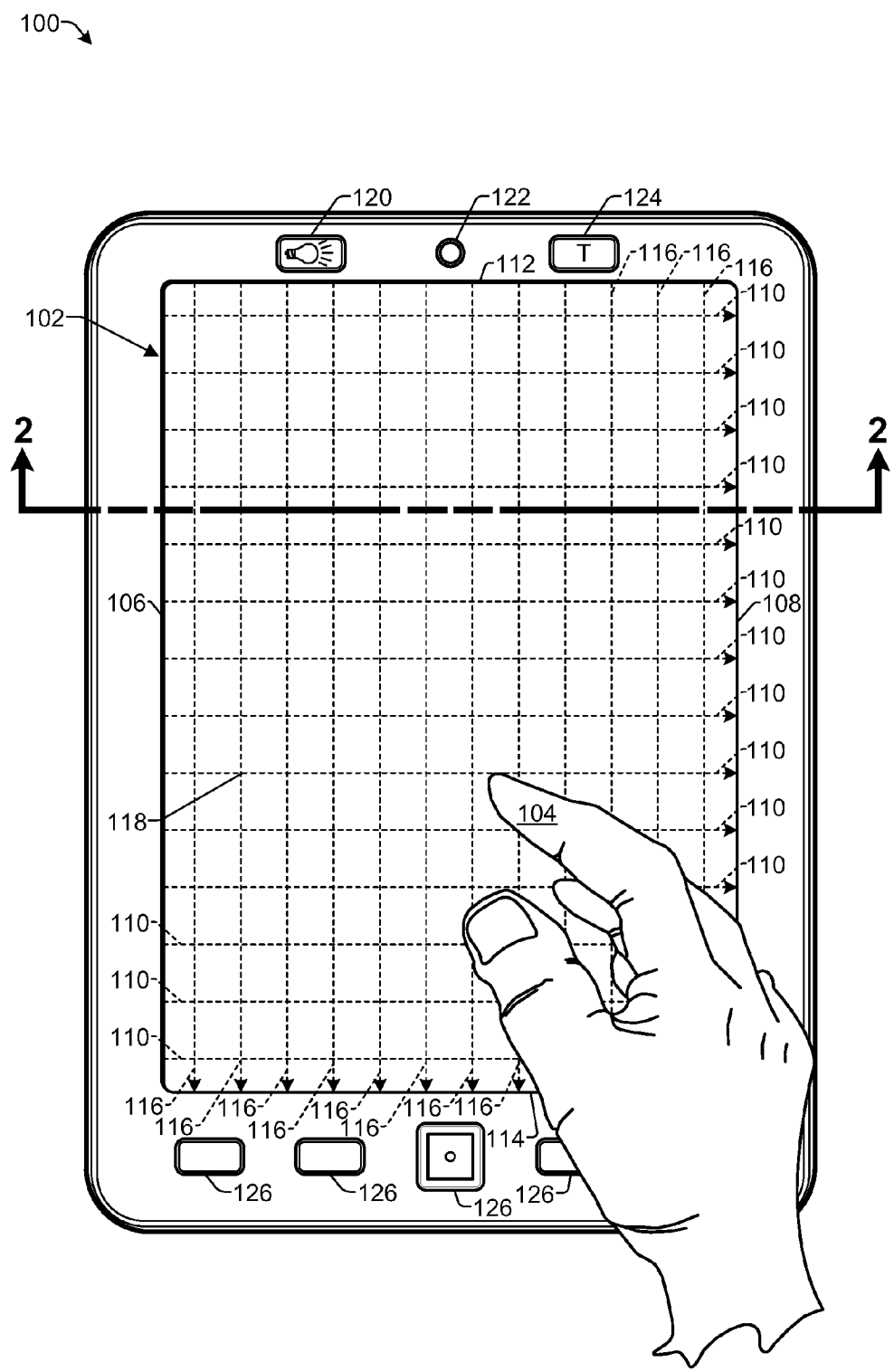
FIG. 1 is an example of an electronic device having light-based touch control and an illuminated display according to some implementations.

This disclosure includes techniques and apparatuses for illuminating a display of an electronic device. Some implementations of the electronic device may include a light-based touch control arrangement in which multiple arrays of light sensors are used to determine the location of a user's finger with respect to the display. In some implementations, the light sensors may sense a first type of light that is projected across the display surface. For example, the first type of light may be pulsed light that is pulsed in a pattern detectable by the light sensors. Additionally, or alternatively, the first type of light may be infrared (IR) light that is not visible in the human range of vision.

When illumination of the display surface is desired by a user, or when low light conditions are detected by a light sensor, visible light may be provided to the display surface to illuminate an image rendered on the display. In some instances, a dual-wavelength or dual-mode light source may be employed that can be selectively activated to emit the first type of light that is detectable by the light sensors, and that can be independently selectively activated to also emit a second type of light that is different from the first type of light, and that provides visible light to the display surface to illuminate at least a portion of the display. In some implementations, the first type of light may be a first wavelength of light in the infrared (IR) range of the spectrum (i.e., approximately greater than 700 nm) and the second wavelength of light may be in the visible light spectrum (i.e., approximately 380-760 nm). Further, in some implementations, the first type of light may be pulsed light generated by rapidly cycling the light source that produces the first type of light. Accordingly, in some implementations, the first type of light may be visible light or IR light that is rapidly pulsed in a pattern detectable by the light sensors. Accordingly, in some implementations, the first type of light may be unsuitable or unable to illuminate the display, while the second type of light may be light in the visible spectrum delivered at a generally constant intensity so that flickering or other variations in lighting intensity are not noticeable to a viewer of the display.

In some implementations, the light source may be a dual-mode light emitting diode (LED) capable of producing the two different types of light. For example, the LED may include a first lead that can receive electrical current to cause the LED to produce IR light, and the LED may include a second lead that can receive electrical current to cause the LED to produce white light or other suitable range of visible light. Additionally, in some implementations, rather than a dual-mode light source, two separate light sources may be used to produce the two different types of light. For example, two different types of LEDs may be utilized as the light sources, with a first type of LED producing pulsed and/or IR light and a second type of LED producing visible light at a generally constant intensity.

Furthermore, some implementations may include one or more light guides to direct the different types of light to desired locations. For example, the electronic device may include a first light guide that projects or radiates the first type of light across an area over the display surface to an opposing light guide that directs the received light to an array of light sensors for providing touch control capabilities to the electronic device. The first light guide may also direct the second type of light, i.e., the constant intensity visible light, into a diffuser for illuminating the display, or may otherwise provide the visible light to the display surface. In some implementations, the light sensors are of a type that is not affected by the added presence of the visible light. For example, in the implementations in which the first light is pulsed in a predetermined pattern, the presence of visible light at a generally constant intensity would not register with the light sensors as pulsed light. Further, in the case in which the light sensors are IR light sensors, visible light may not be detected by certain types of IR light sensors. Additionally, in other implementations, one or more IR filters may be employed to ensure that only IR light is received by the light sensors.

In some implementations, the electronic device may include a low-power-consumption display. For example, in some implementations, the display may employ electronic paper (ePaper) or electronic ink display technology. Thus, the display may be of the bi-stable type, and may use little or no power to maintain a rendered image. Typically, displays of this type are easy to view in normal lighting, even in bright sunlight, and do not include a backlight, which results in substantial power savings. However, the lack of a backlight can make the image on the display difficult to view in low-light or no-light conditions. Accordingly, some implementations herein provide techniques and arrangements for illuminating a front of a display with visible light to enable viewing of the display in low-light or no-light conditions. Further, in some implementations, the visible light may be directed into the display to backlight the display by passing illumination through at least a portion of the display.

The foregoing discussion is provided for the reader's convenience and is not intended to limit the scope of the claims or the disclosure herein. Furthermore, the techniques and arrangements described above and below may be implemented in a number of ways and in a number of contexts. Several example implementations and contexts are provided with reference to the figures, as described below in more detail. However, the example implementations and contexts described herein are but a few of many possible implementations, contexts and environments.

Example Electronic Device

FIG. 1 depicts an example of an electronic device 100 for providing an illuminated display with light-based touch sensing capabilities according to some implementations. In some instances, the electronic device 100 may be a portable or hand-held electronic device. In other instances, the electronic device 100 may be a fixed or generally non-portable device. Non-limiting examples of the electronic device 100 may include eBook readers, smart phones, cellular phones, portable media players, navigation devices, tablet computing devices, personal computers, netbooks, laptops, cash registers, kiosks, touch screens, appliances, gaming devices, home electronics, industrial machinery, robots, and so forth. Accordingly, while some implementations herein are described in the environment of an eBook reader, this disclosure is not limited to use with an eBook reader but may be used with any type of electronic device having a display, such as any of the devices listed above.

The electronic device 100 includes a display 102 configured to present information to a user. For example, the display 102 may render or display numerous different types of text and images, such as in association with various content items, user interfaces, controls, functions, and the like. In some implementations, the display 102 may include electrophoretic, pigmented electrophoretic, electrofluidic, interferometric, cholesteric liquid crystal, bi-stable LCDs, MEMS or other stable display technology that retains an image with no or little power applied to the display. In one implementation, the display 102 uses electronic paper or electronic ink display technology, which is bi-stable. Accordingly, the display 102 may be capable of holding text or other rendered images even when very little or no power is supplied to the display 102.

In some implementations, a light-based touch control technology may be associated with the display 102 for receiving a touch input from a finger 104 of a user, from a stylus, or other type of physical pointer. For example, one or more first light sources (not shown in FIG. 1) may radiate light over the display 102 in a first direction, such as from a left side 106 of the display 102 to a right side 108 of the display 102, as indicated by dashed lines 110. Furthermore, one or more second light sources (not shown in FIG. 1) may project light in a second direction, generally normal or perpendicular to the first direction, such as from a top side 112 of the display 102 to a bottom side 114 of the display 102, as indicated by dashed lines 116. A first array of light sensors (not shown in FIG. 1) may be provided on the right side 108 of the display 102, and a second array of light sensors (not shown in FIG. 1) may be provided along the bottom side 114 of the display 102 to establish a grid 118, as indicated by the multiple crossings of lines 110 and 116. When the user's finger 104 blocks the light received by one or more of the light sensors in the first array and one or more of the light sensors in the second array, the current location of the user's finger 104 with respect to the display 102 can be determined based on which of the light sensors in the first array and which of the light sensors in the second array are not currently receiving light. According to some implementations herein, the light sensors may be infrared sensors that detect infrared light projected across the display from one side of the display to another. Additionally, in some implementations, the light projected across the display may be pulsed in a predetermined pattern that is detectable by the light sensors so that the light sensors are able to distinguish between light produced by the light sources of the electronic device and light received from other external light sources, such as the sun, bright lights, and the like.

In some implementations, visible light may also be selectively projected onto the display 102 to provide visible light to enable a user to read the display 102 in low-light or no-light conditions. For example, a dedicated display illumination control 120 may be provided, such as in the form of a button, to enable the user to manually turn on and off the illumination to the display 102. Furthermore, in some implementations, varying levels of brightness of the illumination may be provided in response to multiple activations of the display illumination control 120. For example, in some implementations, when the user presses the display illumination control 120 once, visible light illumination of the display may be provided at a first level brightness. When the user presses the display illumination control 120 again, visible light may be provided at a second level brightness that is brighter or dimmer than the first level, and so forth. To achieve this, a first set or subset of visible light sources, such as LEDs or other light sources, may be activated to achieve the first level of brightness, a second subset of visible light sources (e.g., more or fewer) may be activated to achieve the second level of brightness, and so forth. Additionally or alternatively, a light sensor 122 may be provided on the electronic device 100 to sense ambient light conditions to control automatically the level of brightness of visible light illumination provided to the display 102.

Additionally, in some implementations, the electronic device 100 may include a touch system control button 124 that can be used to manually turn off and on the touch control system such as for achieving power savings when the touch control system is not being used. The touch control system may also include a sleep mode to achieve power savings. Accordingly, the first type of lighting for the touch control system and the second type of lighting for illuminating the display 102 may be separately and selectively controlled, which can result in substantial savings in power usage. Further, the electronic device 100 may include one or more other physical controls 126, such as navigation buttons, power buttons, selection buttons, and the like, depending on the intended use of the electronic device 100. Additionally, in other implementations, the physical controls 126 may be eliminated.

Figure 2:
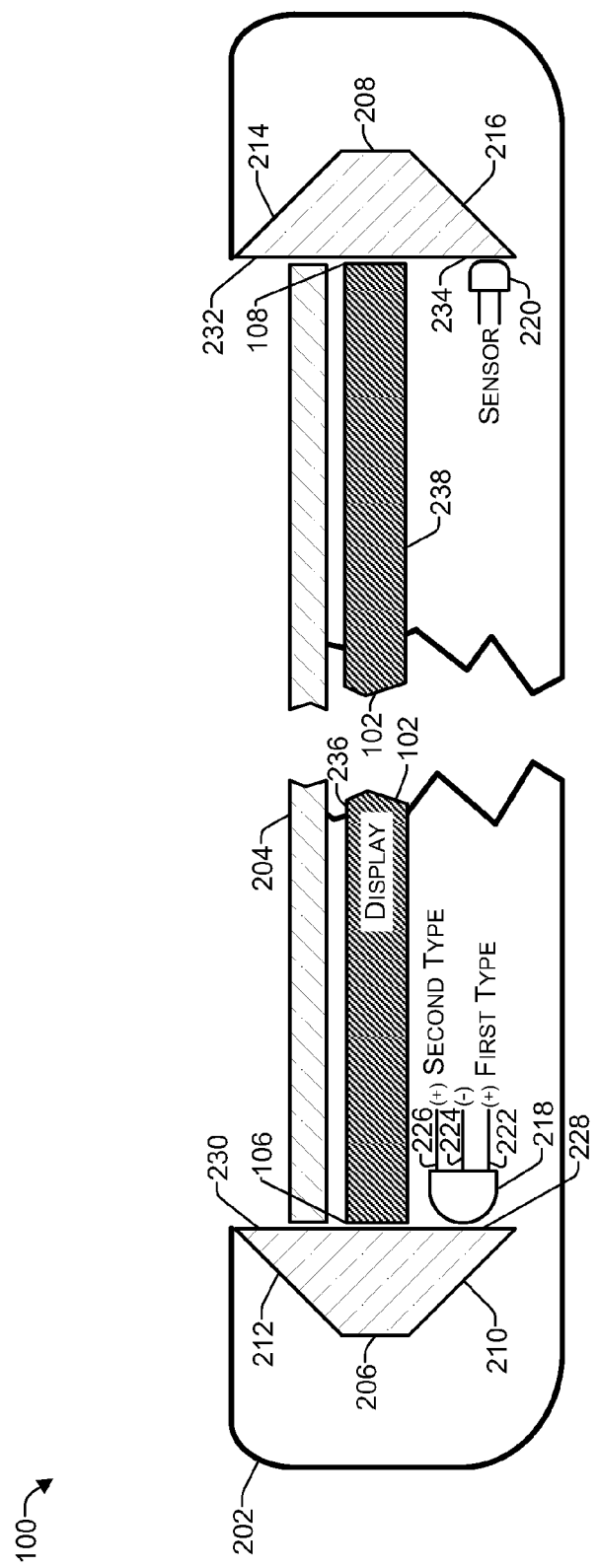
FIG. 2 illustrates a cross-section view of the example electronic device of FIG. 1, according to some implementations, as taken along line 2-2 of FIG. 1.

FIG. 2 illustrates a cross-section view of select components of the example electronic device 100 of FIG. 1 according to some implementations, as taken along line 2-2 of FIG. 1. For clarity, some elements of the electronic device 100 are not shown in FIG. 2. In the illustrated example, the electronic device 100 includes the display 102, as described above, maintained within a device housing 202 of plastic, metal or other suitable material. In the illustrated example, a transparent diffuser 204 is provided over the display 102 for diffusing visible light projected to the display 102. Diffuser 204 may include various different configurations for diffusing visible light evenly over the surface of the display 102 such as for avoiding bright spots, dim spots and the like. In other implementations, the diffuser 204 may be an integral part of display 102, while in yet other implementations, the diffuser 204 may be eliminated altogether or incorporated into a light guide, as described below. Additionally, while the diffuser 204 is shown having a rectangular cross section, in other implementations, the diffuser may have a tapered cross-section or other suitable cross-section to achieve a desired light distribution effect.

A first light guide 206 is located on the left side 106 of the display 102, and a second light guide 208 is located on the right side 108 of the display 102. Each light guide 206, 208 may be constructed from a transparent light guiding material, such as acrylic, glass, or the like. In this example, the first light guide 206 includes a first reflective angled surface 210 and a second reflective angled surface 212. Similarly, second light guide 208 includes a first reflective angled surface 214 and a second reflective angled surface 216. In the illustrated example, the light guides 206 and 208 have a trapezoidal cross-section, with each of angled surfaces 210, 212, 214 and 216 being positioned at a 45-degree angle. However, in other implementations, the light guides 206 and 208 may have different configurations such as a triangular cross-section or an inverted "L" cross-section, as described in other examples below.

One or more light sources 218 may be positioned to emit light into the first light guide 206 while one or more light sensors 220 may be positioned adjacent to the second light guide 208 to receive light projected into the second light guide 208. In the illustrated example, the light source 218 may be capable of producing both the first type of light and the second type of light described above. For instance, the light source 218 includes three leads, with a first lead 222 for receiving current to power the portion of the light source 218 that produces the light of the first type, a second lead 224 as a ground, and a third lead 226 for receiving current to power the portion of the light source 218 that produces the second type of light. In some implementations, the light source 218 may be a dual-mode LED that produces IR light when electrical current is received through the first lead 222, and that produces visible light when electrical current is received through the third lead 226. In some implementations, the electrical current provided to the first lead 222 may be pulsed to produce pulsed light in a desired pattern that is detectable by the light sensor 220.

The light source 218 may be positioned to emit light into a first face or first light passage 228 of the first light guide 206. The first light guide 206 also includes a second light passage 230 from which the light exits after reflecting of the first angled surface 210 and the second angled surface 212. Similarly, the second light guide 208 includes a first light passage 232 and a second light passage 234. In the illustrated example, the second light passage 230 of the first light guide and the first light passage 232 of the second light guide are located above the display surface 236 (i.e., the side of the display 102 having the viewable image). Furthermore, the first light passage 228 of the first light guide 206 and the second light passage 234 of the second light guide are located below a bottom surface 238 of the display 102.

Figure 3:
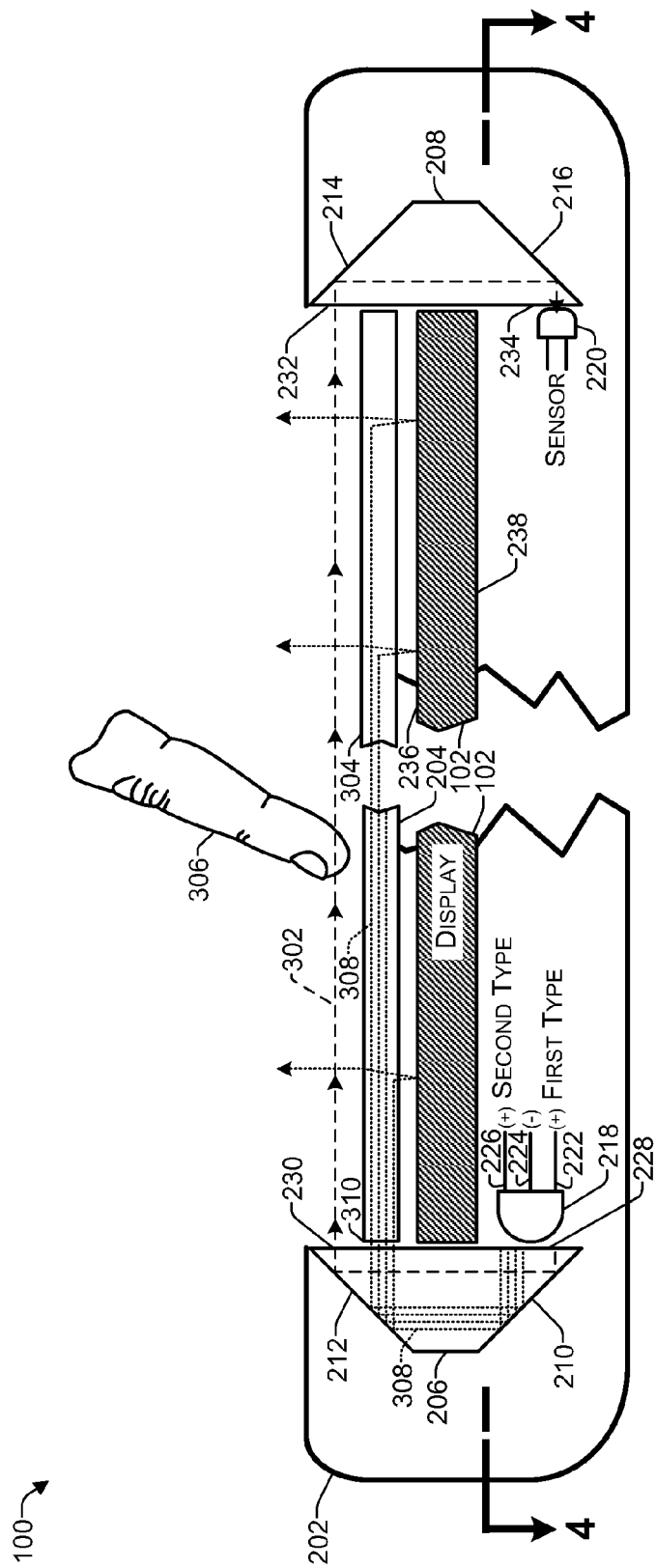
FIG. 3 illustrates the example electronic device of FIG. 2, showing paths of a first type of light and a second type of light according to some implementations.

FIG. 3 illustrates the cross-section view of the example electronic device 100 of FIG. 2, showing light paths of the first light type and the second light type according to some implementations. In the illustrated example, suppose that initially current is only provided to the first lead 222 of the light source 218, thereby causing the light source 218 to emit the first type of light 302 (depicted by a dashed line). The first type of light 302 emitted from the light source 218 enters the first light guide 206 through the first light passage 228, reflects off the first angled surface 210, reflects off the second angled surface 212, and exits the light guide 206 through the second light passage 230. Thus, at least a portion of the first type of light 302 emitted by the light source 218 passes over the diffuser 204 and the display surface 236. The first type of light 302 travels across the display 102, from the left side to the right side, such as over an upper or external surface 304 of the diffuser and enters the first light passage 232 of the second light guide 208 located on the opposite side of the display 102 from the first light guide 206. The first type of light 302 reflects off the first angled surface 214, reflects off the second angled surface 216, exits through the second light passage 234, and impinges on the light detector 220.

When a user inserts a finger 306, a stylus, or other pointer or object into the path of the first type of light 302, the first type of light 302 received by the light sensor 220 is blocked, therefore providing an indication of a location of the finger 306 along one axis (i.e., an axis perpendicular to the plane of the current view). By providing a first array of light sensors 220 along a first axis and a second array of light sensors 220 along a second axis, as described additionally below, it is possible to determine a location of the finger 306 in a two-dimensional space.

In addition, when electric current is applied to the third lead 226 of the light source 218, the light source 218 emits the second type of light 308 into the first light passage 228 of the first light guide 206. The second type of light 308 reflects off the first angled surface 210, reflects off the second angled surface 212, and exits the first light guide 206 through the second light passage 230. At least a portion of the second type of light 308 exits the second light passage 230 adjacent to an input or entry end 310 of the diffuser 204. The second type of light 308 (i.e., visible light) travels through the diffuser 204 and diffuses or scatters to reflect off the display surface 236 of the display 102 and back through the diffuser 204 to provide an illumination of the display surface 236 to a viewer. Various different types of diffusers 204 may be used to obtain a generally even lighting effect distributed over at least a portion of the display 102.

Furthermore, although not shown in the example of FIG. 3, the second type of light 308 may travel along the same path as the first type of light 302 described above, but because the light sensor 220 may be configured to detect only infrared light and/or pulsed light, the second type of light 308 (i.e., visible light of generally consistent intensity) does not affect the ability of the sensor 220 to perform as described above. Similarly, the first type of light 302 may travel along the same path as the second type of light 308, but because the first type of light is IR light and/or pulsed light, the first type of light 302 is not visible to a user viewing the display 102.

Figure 4:
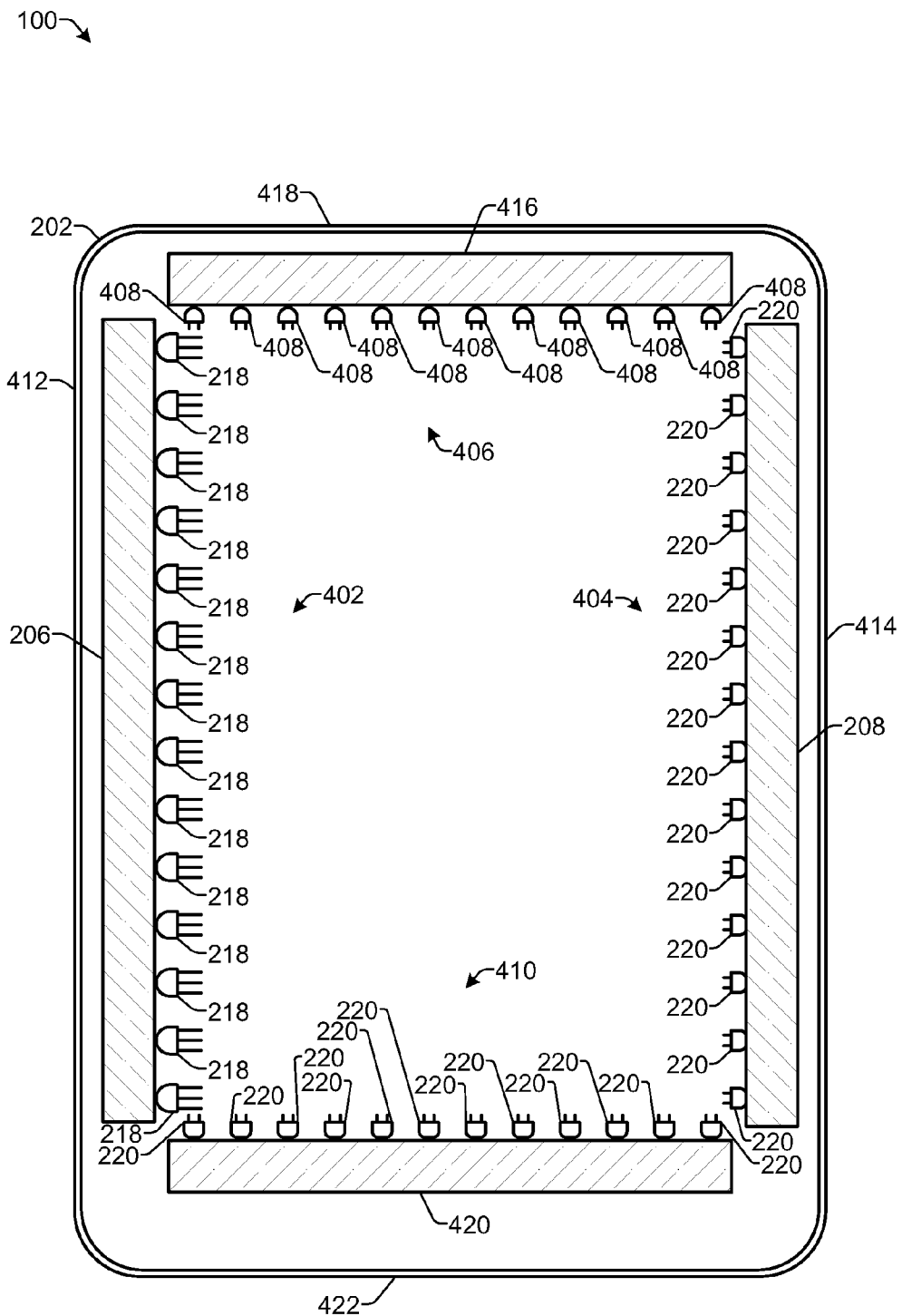
FIG. 4 illustrates a cross-section plan view of the example electronic device of FIGS. 1-3, according to some implementations, as taken along line 4-4 of FIG. 3.

FIG. 4 illustrates a cross section plan view of the example electronic device 100 of FIGS. 1-3, according to some implementations, as taken along line 4-4 of FIG. 3. In the example of FIG. 4, the light source 218 of FIG. 3 is included in a first light source array 402 comprising a plurality of the light sources 218, some or all of which may be capable of producing both the first type of light and the second type of light as described above. Similarly, the light sensor 220 is included in a first sensor array 404 of light sensors 220, each of which is capable of receiving and sensing the first type of light from one or more of the light sources 218 in the first light source array 402.

A second light source array 406 may include a plurality of light sources 408. In some implementations, the light sources 408 in the second light source array 406 may be the same as the light sources 218 described above, capable of producing both first type of light and the second type of light. However, in other implementations, the light sources 408 may be light sources that only emit first type of light, rather than both first type of light and second type of light. For example, the amount of visible light produced by the light sources 218 in the first array 402 may typically be sufficient to fully illuminate the display 102 for viewing with no additional lighting, so that additional visible light produced from the second light source array 406 may not be necessary in some implementations. Furthermore, a second sensor array 410 of light sensors 220 may be positioned on an opposite side of the display 102 from the second light source array 406, for receiving the first type of light emitted from the light sources 408 in the second light source array 406.

In the illustrated example, the first light guide 206 extends along a left side 412 of the electronic device 100, adjacent to the first light source array 402, and proximate to the left side 106 of the display 102 (not shown in FIG. 4). The second light guide 208 extends along a right side 414 of the electronic device 100, adjacent to the sensors 220 of the first sensor array 404, and proximate to the right side 108 of the display 102 (not shown in FIG. 4). In addition, a third light guide 416 extends a long a top side 418 of the electronic device 100, adjacent to the light sources 408 of the second light source array 416, and proximate to the top side 112 of the display 102 (not shown in FIG. 4). Further, a forth light guide 420 extends a long a bottom side 422 of the electronic device 100, adjacent to the sensors 220 of the second sensor array 410, and proximate to the bottom side 114 of the display 102 (not shown in FIG. 4). In some implementations, the third light guide 416 and the fourth light guide 420 may have trapezoidal cross-sections similar to those of the first light guide 206 and the second light guide 208, as described above with reference to FIG. 2. However, in other implementations, the light guides 206, 208, 416 and 420 may have different cross-sectional shapes and configurations, such as in the examples described below. Accordingly, the implementations herein are not limited to the particular shapes and configurations of the light guide examples shown in the figures, and may be extended to other cross-sectional shapes and configurations, light source positions, and the like, as will be apparent to those of skill in the art in view of the disclosure herein.

As mentioned above, the amount of illumination provided to the display surface 236 may be controlled by controlling how many of the light sources 218 are activated to emit the second type of light. For example, a first subset of the light sources that includes for example, four of the light sources 218 may be energized to produce the second type of light to provide a first level of illumination to the display 102. To achieve a brighter level of illumination, for example, seven of the light sources 218 may be energized to emit the second type of light. To achieve a still brighter level of illumination a still greater subset of the light sources may be energized to emit the second type of light, and so forth.

Figure 5:
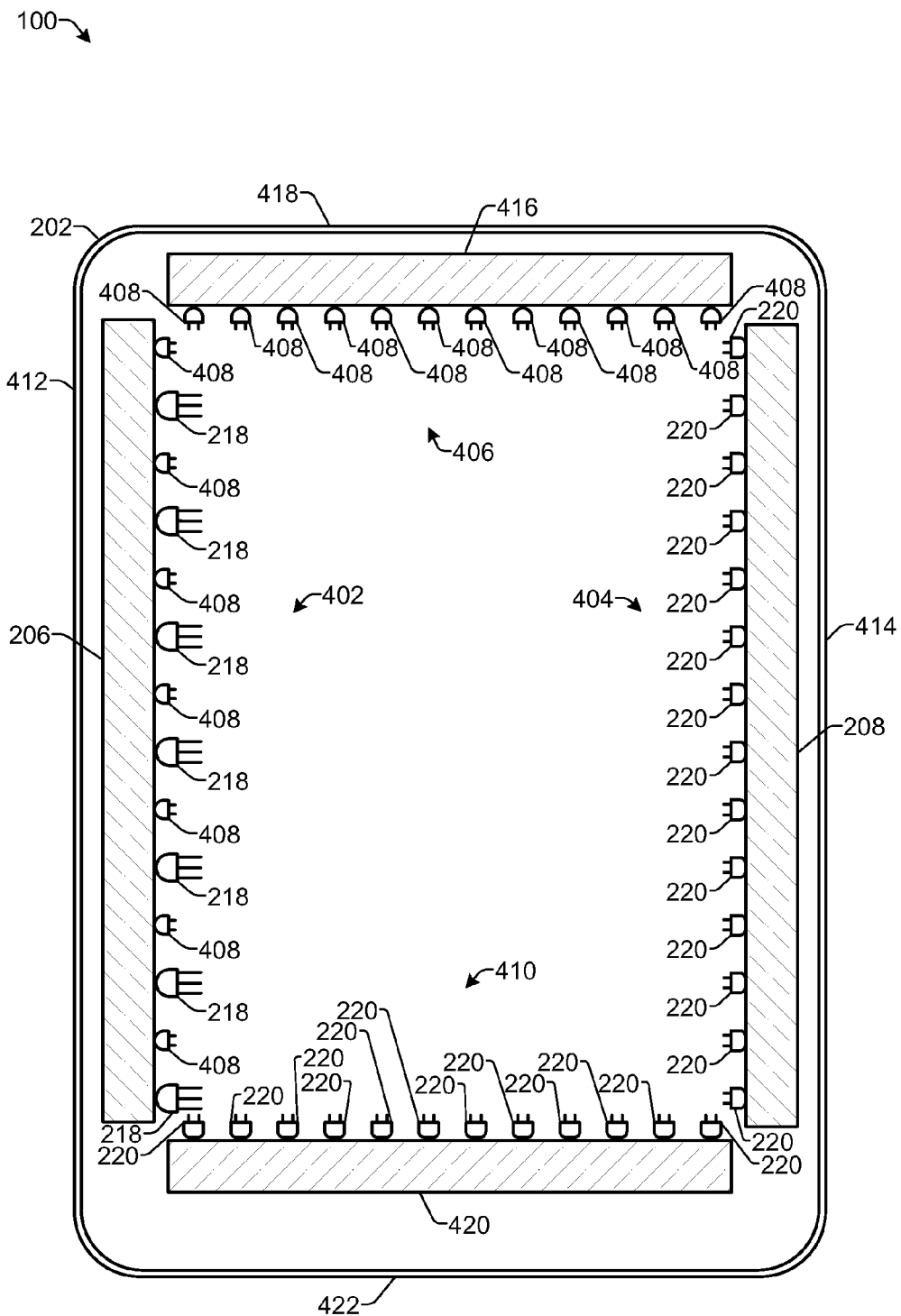
FIG. 5 illustrates a cross-section plan view of the example electronic device of FIGS. 1-3, according to some implementations, as taken along line 4-4 of FIG. 3.

FIG. 5 illustrates a cross section plan view of the example electronic device 100 of FIGS. 1-3 according to some implementations, as taken along line 4-4 of FIG. 3. In the example of FIG. 5, only some of the light sources in the first light source array 402 are the dual mode light sources 218 while others of the light sources in the first light source array 402 are the light sources 408 which only emit the first type of light. For example, the light sources in the first light source array 402 may be alternated between light sources 408 that emit only the first type of light and the light sources 218 that emit both the first type of light and the second type of light. For example, in some implementations, emitting visible light at every other light source 218 in the first light source array 402 may be sufficient to fully illuminate the display 102 for viewing. Accordingly, in these implementations, it may be unnecessary for all of the light sources in the first light source array 402 to be capable of emitting both the first type of light and the second type of light. Similarly, in some implementations, the second light source array 406 may include one or more of the dual-mode light sources 218, depending on the light distribution achieved by the diffuser 204 or other light distribution and brightness considerations. For example, in some implementations, it may be desirable to illuminate only a portion of the display 102, such as an upper half of the display 102. Accordingly, in such a situation, only a subset of the light sources 218 proximate to the upper half of the display are activated to produce the second type of light, thereby illuminating the upper half of the display 102.

Figure 6:
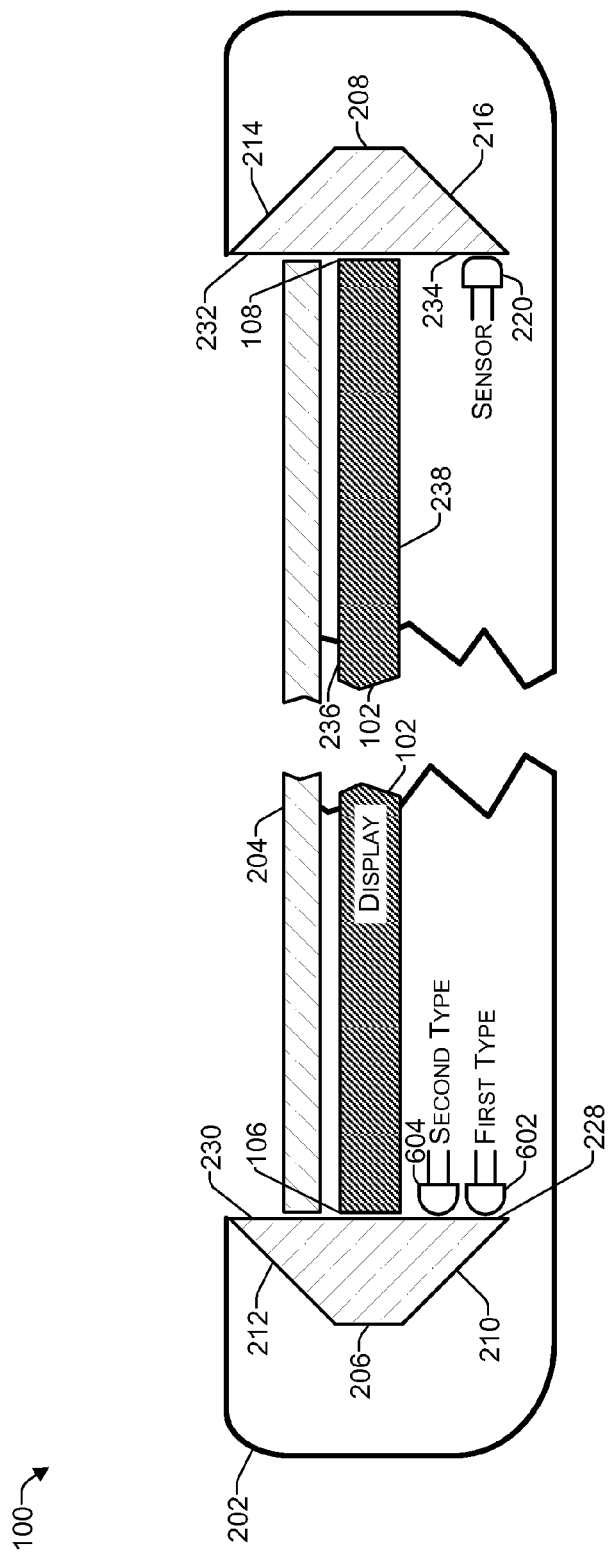
FIG. 6 illustrates a cross-section view according to some implementations of the example electronic device of FIG. 1, as taken along line 2-2 of FIG. 1.
Figure 7:
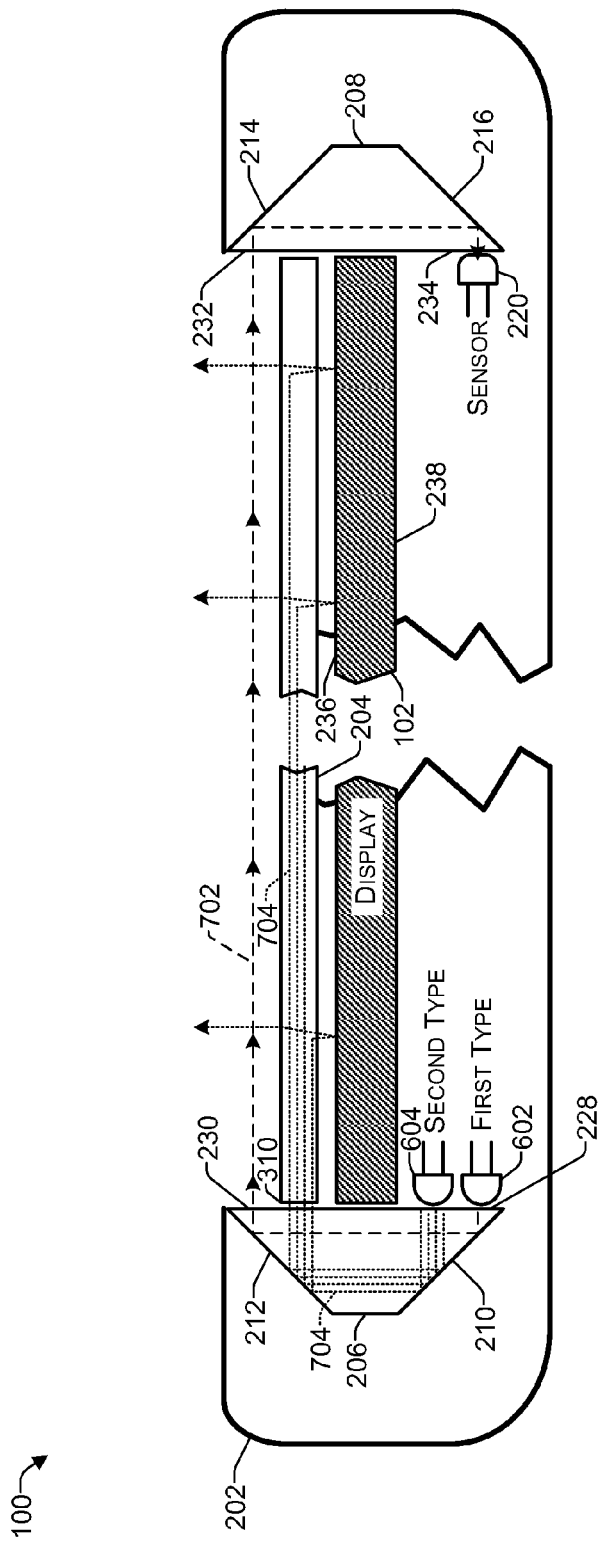
FIG. 7 illustrates the example electronic device of FIG. 6, showing paths of a first type of light and a second type of light according to some implementations.

FIG. 6 illustrates a cross-section view according to some implementations of the example electronic device 100 of FIG. 1, as taken along line 2-2 of FIG. 1. In the implementation illustrated in FIG. 6, rather than using a dual-mode light source 218, a pair of light sources may be provided such as first type of light source 602 and a second type of light source 604. For instance, the first type of light source 602 may be positioned below the second type of light source 604. In some implementations, this configuration may concentrate more of each of the different types of light at the desired locations. For example, as illustrated in FIG. 7, the first type of light source 602 emits the first type of light 702 into the first light passage 228 of the first light guide 206. The first type of light 702 from the first type of light source 602 reflects off the first angled surface 210, reflects off the second angled surface 212, travels across the space over the display 102 and the diffuser 204, enters the first light passage 232 of the second light guide 208, reflects off the first angled surface 214, the second angled surface 216, exits through the second light passage 234, and impinges on the light sensor 220. Furthermore, the second type of light source 604 emits the second type of light 704 into the first light passage 228 of the first light guide 206. The second type of light 704 reflects off the first angled surface 210, reflects off the second angled surface 212, and passes into the entry end 310 of the diffuser 204. In the diffuser 204, the second type of light 704 is scattered or diffused to reflect off the display surface 236 of the display 102, back through the diffuser 204 and toward a viewer of the display. Consequently, by positioning the second type of light source 604 above the first type of source 602, in some implementations very little of the second type of light 704 reaches the light sensor 220, and likewise, very little of the first type of light enters the diffuser 204. Accordingly, the relative positions of the first light guide 206, the second type of light source 604, and the entry end of the diffuser 310 results in the second type of light 704 being predominantly projected into the entry end 310 of the diffuser 204, while the first type of light 702 is predominantly projected across the display 102 to the second light guide 208.

In some implementations, a second type of light source 604 is paired with each first type of light source 602 in the first light source array 402, as described above. However, in other implementations, a second type of light source 604 need not be paired with each first type of light source 602. For example, if there are fourteen first type of light sources 602 in the first light source array 402, then only seven of the first type of light sources 602 might have a second type of light source 604 paired with them, such as every other one, similar to the configuration illustrated in FIG. 5. Other suitable configurations will also be apparent to those of skill in the art in view of the disclosure herein.

Figure 8:
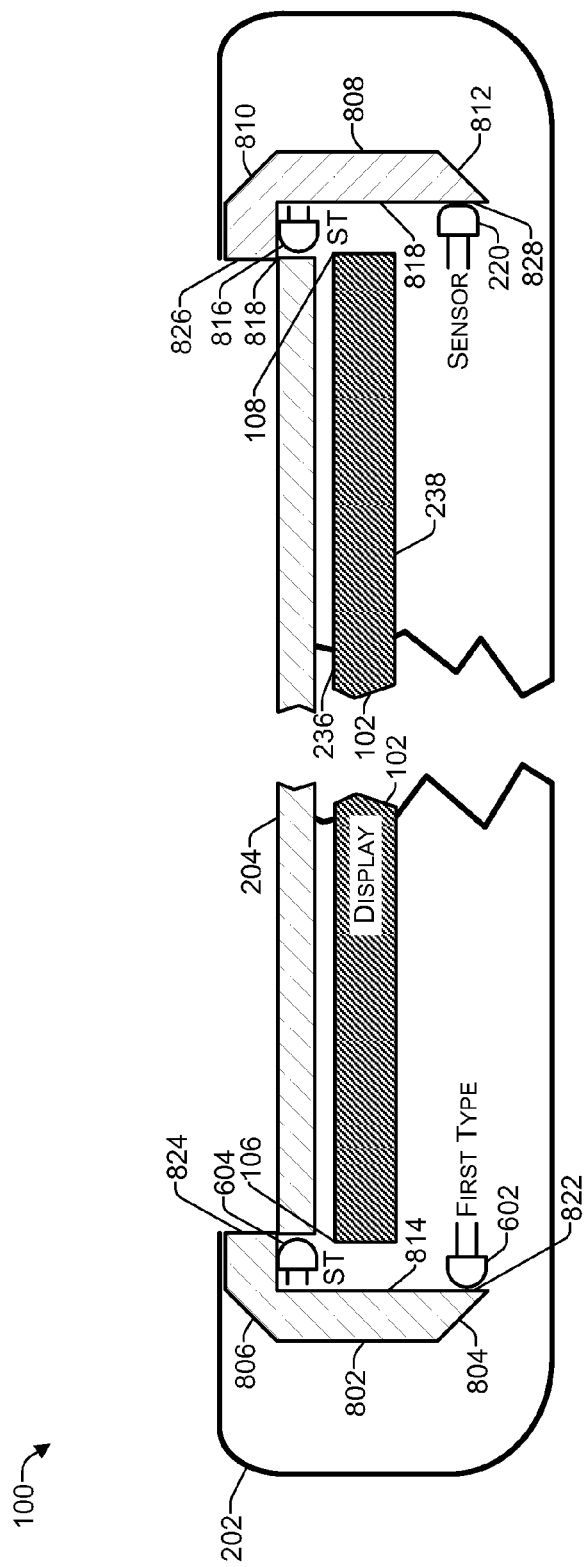
FIG. 8 illustrates a cross-section view according to some implementations of the example electronic device of FIG. 1, as taken along line 2-2 of FIG. 1.

FIG. 8 illustrates a cross-section view according to some implementations of the example electronic device 100 of FIG. 1, as taken along line 2-2 of FIG. 1. In the implementation illustrated in FIG. 8, a first light guide 802 is provided on the left side 106 of the display 102. The first light guide 802 may have a cross section generally shaped as an inverted "L", and includes a first reflective angled surface 804 and a second reflective angled surface 806. Similarly, positioned on the right side 108 of the display 102, opposite to the first light guide 802, is a second light guide 808, which also may have a cross section similar to an inverted "L". The second light guide 808 includes a first reflective angled surface 810 and a second reflective angled surface 812.

In the example of FIG. 8, the second type of light source 604 may be positioned adjacent to the entry end 310 of the diffuser 204, while the first type of light source 602 may be positioned to emit the first type of light into the first light guide 802. Accordingly, the first light guide 802 may include a cutaway portion or recess 814 to accommodate the second type of light source 604 adjacent to the entry end 310 of the diffuser 204. Additionally, in some implementations, a second type of light source 816 may also be positioned on the right side 108 of the display with 102 to emit visible light into the diffuser 204 from the right side end 818 of the diffuser 204. For example, a cutaway portion 820 may be included in the second light guide 808 to accommodate the second type of light source 816. Alternatively, in some implementations, including any of the implementations described herein, the second type of light source 604 may be eliminated from the left side 106 of the display and provided just on the right side 108, or along the top, and/or bottom edges of the display 102, or other variations thereof.

Further, the first light guide 802 includes a first light passage 822 for receiving light emitted from the first type of light source 602, and a second light passage 824 for emitting the light received in the first light passage 822. Similarly, the second light guide 808 includes a first light passage 826 and a second light passage 828. In this example, the second light passage 824 of the first light guide and the first light passage 826 of the second light guide are located above the display 102, the display surface 236 and the diffuser 204. Further, the first light passage 822 of the first light guide 802 and the second light passage 828 of the second light guide 808 are located below the bottom surface 238 of the display 102.

Figure 9:
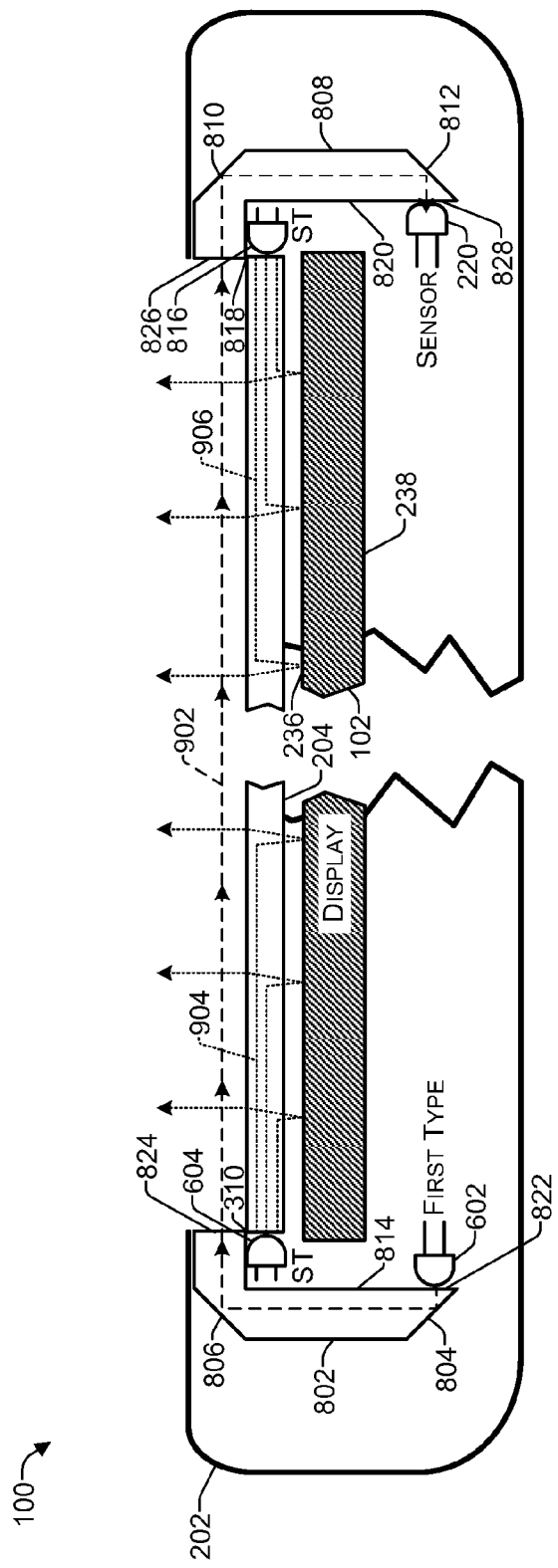
FIG. 9 illustrates the example electronic device of FIG. 8, showing paths of a first type of light and a second type of light according to some implementations.

In this example, as illustrated in FIG. 9, the first type of light source 602 may emit the first type of light 902 into the first light passage 822 of the first light guide 802. The first type of light 902 reflects off the first angled surface 804, and the second angled surface 806 to be emitted through the second light passage 824 of the first light guide 802, toward the second light guide 808. The second light guide 808 receives the first type of light 902 through the first light passage 826. The first type of light 902 reflects off the first angled surface 810, reflects off the second angled surface 812, and exits through the second light passage 828 to impinge on the light sensor 220. Furthermore, the second type of light source 604 emits the second type of light 904 directly into the entry end 310 of the diffuser 204 on the left side and, optionally, the second type of light source 816 may emit the second type of light 906 directly into the second entry end 818 of the diffuser 204 on the right side of the diffuser 204. As another alternative, the second type of light source 604 may be eliminated from the left side and only the second type of light source 816 is provided on the right side of the display 102. Further, in some implementations, a suitable number of the second type of light sources 604, 816 may be provided around the perimeter of the diffuser 204, including along the top and bottom edges, as necessary to achieve a desired lighting effect.

Figure 10:
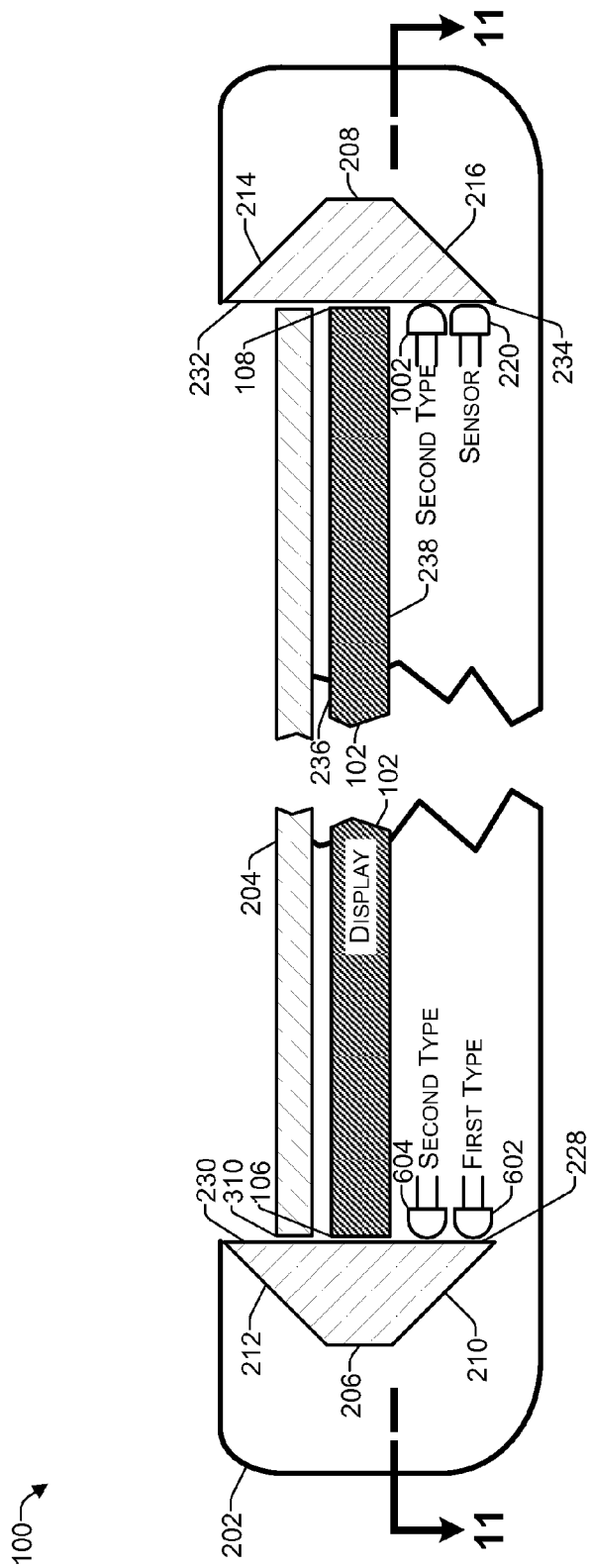
FIG. 10 illustrates a cross-section view according to some implementations of the example electronic device of FIG. 1, as taken along line 2-2 of FIG. 1.

FIG. 10 illustrates a cross-section view according to some implementations of the example electronic device 100 of FIG. 1, as taken along line 2-2 of FIG. 1. The implementation illustrated in FIG. 10, includes the first type of light source 602 and the second type of light source 604, similar to the arrangement described above with respect to FIGS. 6 and 7. Additionally, in this implementation, one or more additional second type of light sources 1002 may be included on the right side 108 of the display 102, positioned adjacent to and above one or more of the light sensors 220. Accordingly, in this configuration, the second type of light sources 604 and 1002 may be evenly distributed about the perimeter of the display 102 for projecting in to the diffuser 204, and providing a uniform illumination of the display 102.

Figure 11:
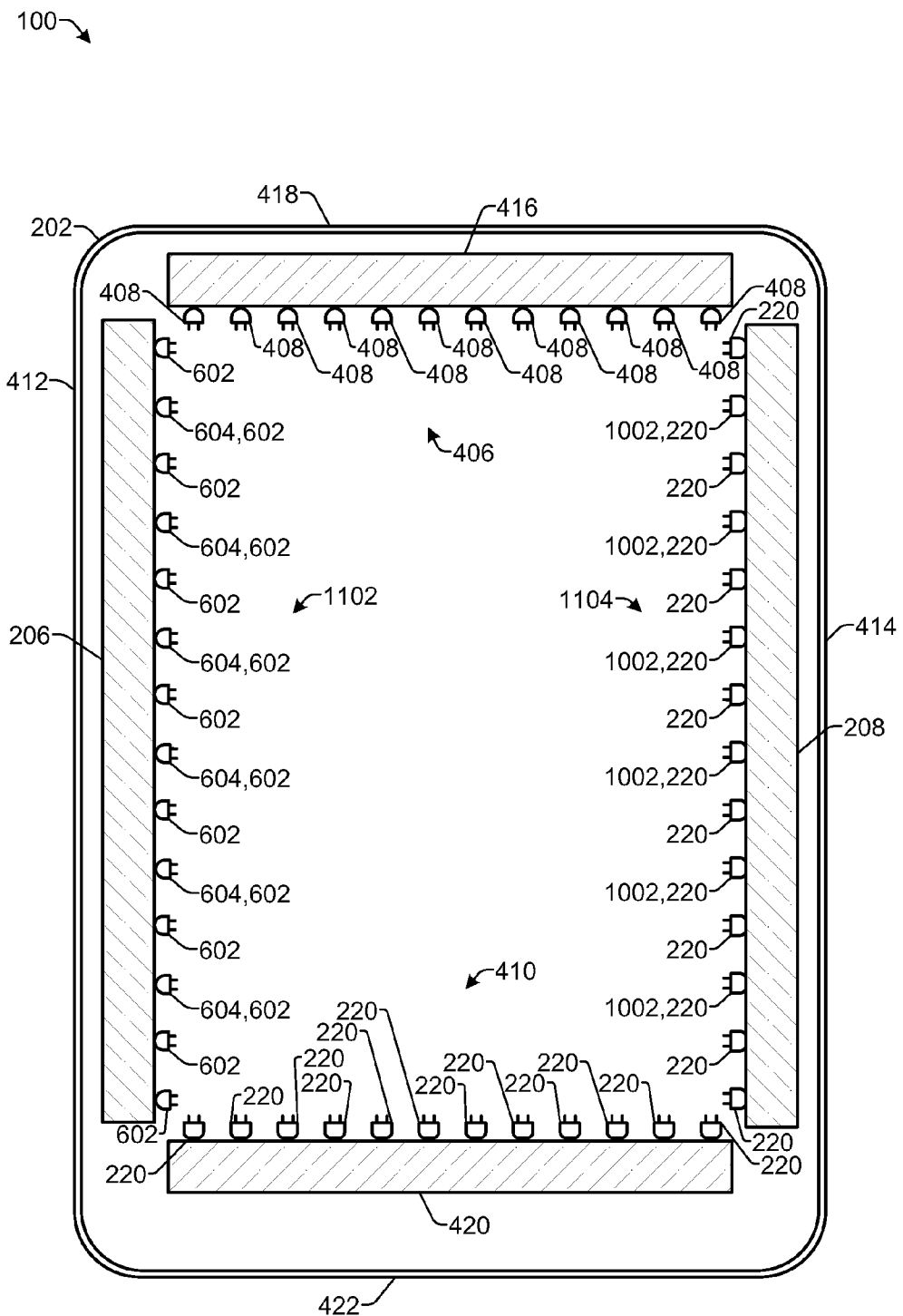
FIG. 11 illustrates a cross-section plan view of the example electronic device of FIG. 10 according to some implementations, as taken along line 11-11 of FIG. 10.

For example, as illustrated in FIG. 11, the second type of light sources 604, 1002 may alternate, rather than being paired with each first type of light source 602 or light sensor 220, respectively. Thus, in this implementation, a first light source array 1102 may include a plurality of the first type of light sources 602, while alternating first type of light sources 602 may also be paired with a second type of light source 604. Similarly, a first sensor array 1104 may include a plurality of the light sensors 220. Alternating light sensors 220 may be paired with a second type of light source 1002. Furthermore, as discussed above, not all of the second type of light sources need be energized at any one time. For example, varying levels of brightness may be achieved by lighting a subset of only some of the second type of light sources 604, 1002. Numerous other variations will be apparent to those of skill in the art in view of the disclosure herein.

Figure 12:
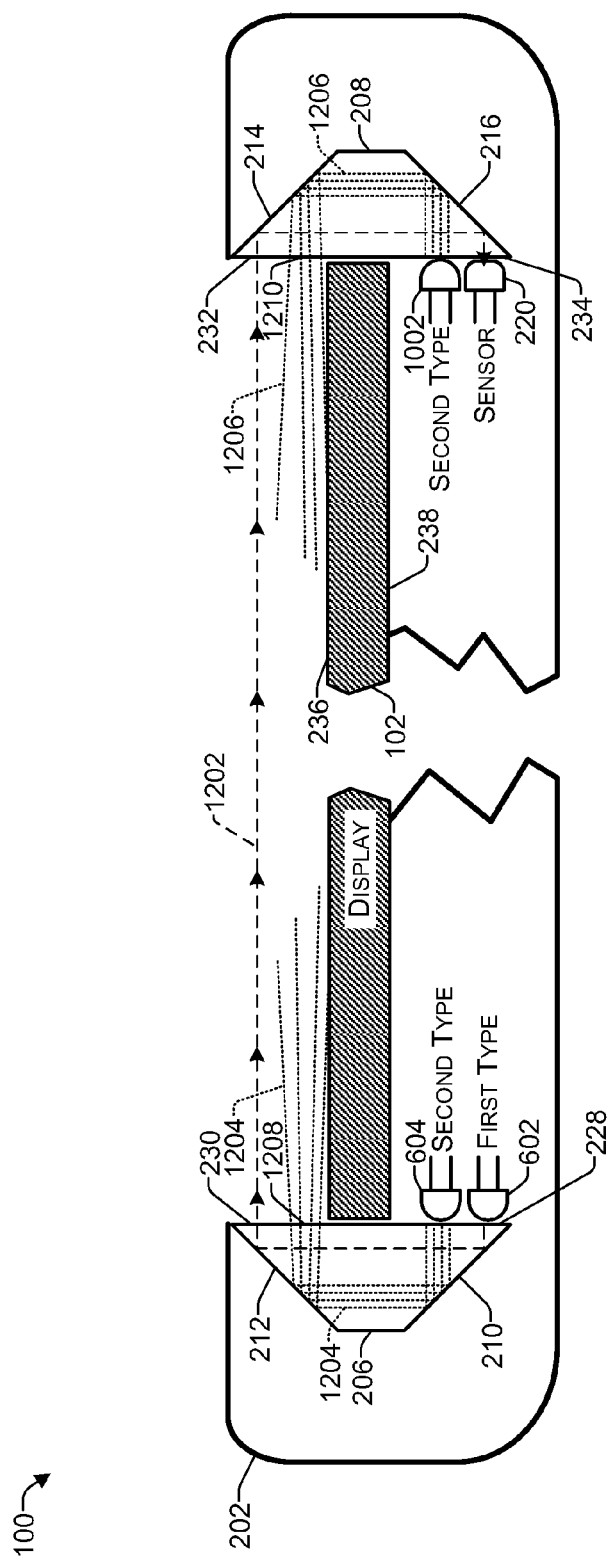
FIG. 12 illustrates a cross-section view according to some implementations of the example electronic device of FIG. 1, as taken along line 2-2 of FIG. 1.

FIG. 12 illustrates a variation of the implementation of FIGS. 10-11 in which the diffuser 204 is not used and the second type of light is able to project directly onto the display surface 236. In this example, the first type of light source 602 emits the first type of light 1202 into the first light passage 228 of the first light guide 206. The first type of light 1202 exits the second light passage 230 of the first light guide 206, and travels across the display 102 into the first light passage 232 of the second light guide 208. The first type of light exits the second light guide 208 through the second light passage 234 for sensing by the light sensor 220. Additionally, the second type of light source 604 emits the second type of light 1204 into the first light passage 228 of the first light guide 206. The second type of light 1204 reflects off the first angled surface 210, reflects off the second angled surface 212, and exits through the second light passage 230 to illuminate the display surface 236 of the display 102. The second type of light 1206 from the second type of light source 1002 travels a similar path through the second light guide 280 to also provide illumination to the right side of display surface 236.

Additionally, in some implementations, a portion 1208 of the first light passage 230 and a portion 1210 of the second light passage 232 may include an embedded diffuser or a thin diffuser overlaid on the area through which the second type of light 1204, 1206 exits. As another alternative, the portion 1208 of the of the first light passage 230 and the portion 1210 of the second light passage 232 through which the second type of light 1204, 1206 exits may be shaped to include a lens to better direct the second type of light 1204, 1206 onto the display surface 236, while the portions of the first light passage 230 and the second light passage 232 passing the first type of light 1202 may remain unaffected. The diffuser 204 may be similarly eliminated from and/or replaced in the other implementations described herein.

Figure 13:
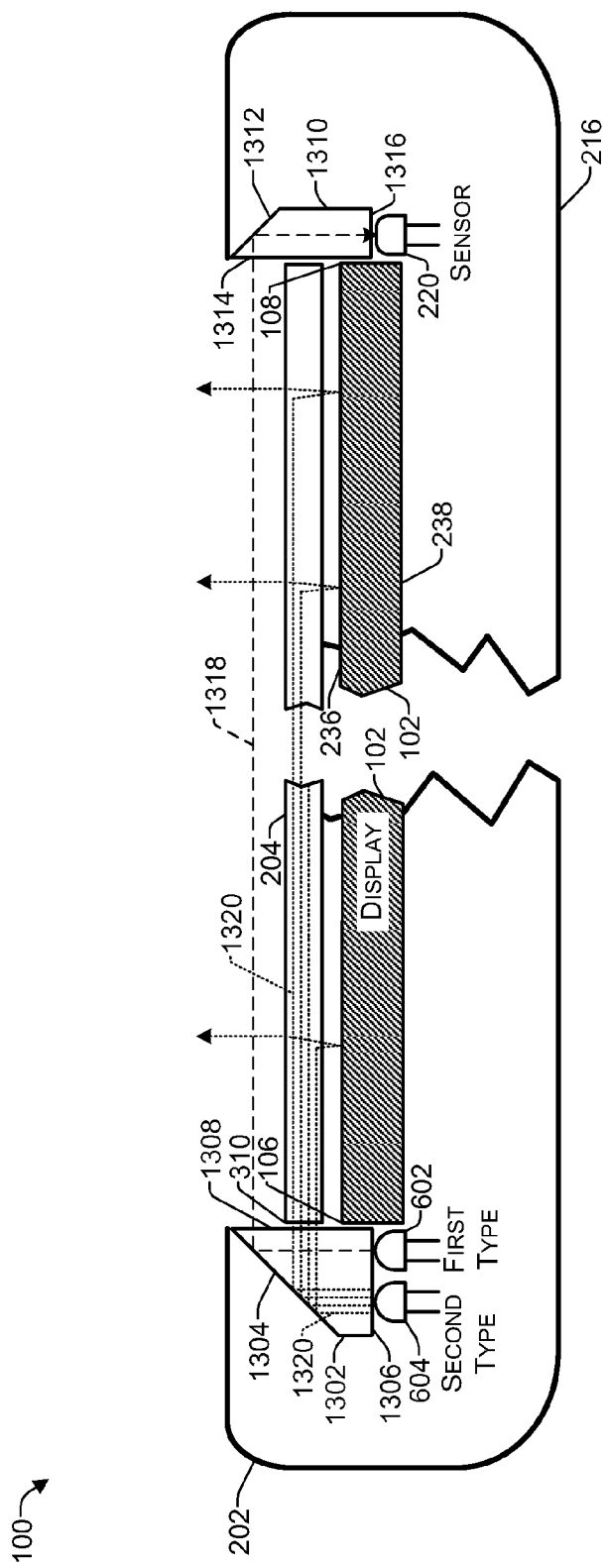
FIG. 13 illustrates a cross-section view according to some implementations of the example electronic device of FIG. 1, as taken along line 2-2 of FIG. 1.

FIG. 13 illustrates a cross-section view according to some implementations of the example electronic device 100 of FIG. 1, as taken along line 2-2 of FIG. 1. The implementation illustrated in FIG. 13, includes the first type of light source 602 and the second type of light source 604, similar to the arrangement described above with respect to FIGS. 6 and 7. Alternatively, the implementation of FIG. 13 may include the dual-mode light source 218 in place of the first type of light source 602 and the second type of light source 604. In the implementation illustrated in FIG. 13, a first light guide 1302 is provided on the left side 106 of the display 102. The first light guide 802 may have a generally triangular or trapezoidal cross section, and includes a reflective angled surface 1304, a first light passage 1306, and a second light passage 1308. For example, the first light passage 1306 may be of a width to accommodate the first type of light source 602 and the second type of light source 604. Similarly, positioned on the right side 108 of the display 102, opposite to the first light guide 1302, is a second light guide 1310, which may have a cross section similar to that of the first light guide 1302, or which may be further truncated, as shown having a trapezoidal cross section of an approximate width of the light sensor 220. The second light guide 1310 includes a reflective angled surface 1312, a first light passage 1314 and a second light passage 1316.

In the illustrated example, the first type of light source 602 emits the first type of light 1320 into the first light passage 1306 of the first light guide 1302. The first type of light 1318 reflects off the angled surface 1304, exits the second light passage 1308 of the first light guide 1302, and travels across the display 102 into the first light passage 1314 of the second light guide 1310. The first type of light 1318 reflects off the angled surface 1312 and exits the second light guide 1310 through the second light passage 1316 for sensing by the light sensor 220. Additionally, the second type of light source 604 emits the second type of light 1320 into the first light passage 1306 of the first light guide 1302. The second type of light 1320 reflects off the angled surface 1304 and exits through the second light passage 1308. In some implementations, the second type of light 1320 may enter the entry end 310 of the diffuser 204 to be diffused for illuminating the display surface 236 of the display 102. In other implementations, as described above with respect to FIG. 12, the diffuser 204 may be eliminated, embedded in the second light passage 1308, or the like.

Additionally, in some implementations, the second light guide 1310 may have a cross section similar to the first light guide 1302, and one or more additional second type of light sources may be positioned adjacent to the light sensors 220 on the right side 108 of the display, such as in the configurations described above with respect to FIGS. 10-12. Furthermore, the light sources and/or light sensors may be positioned in other locations than those shown in the examples, with correspondingly configured light guides for directing the first type of light across the display and directing the second type of light onto the display surface. For example, the first type of light source 602 may be positioned in a different orientation from the second type of light source 604, such as is described above with respect to FIGS. 7-8, some of the light sources may be positioned on the outer side of the light guide (e.g., emitting light in a direction toward the display into a periscope-type light guide), and so forth. Consequently, implementations herein are not limited to the particular examples and arrangements shown in the drawings, but may be extended to other configurations as would be apparent to those of skill in the art in view of the disclosure herein.

Figure 14:
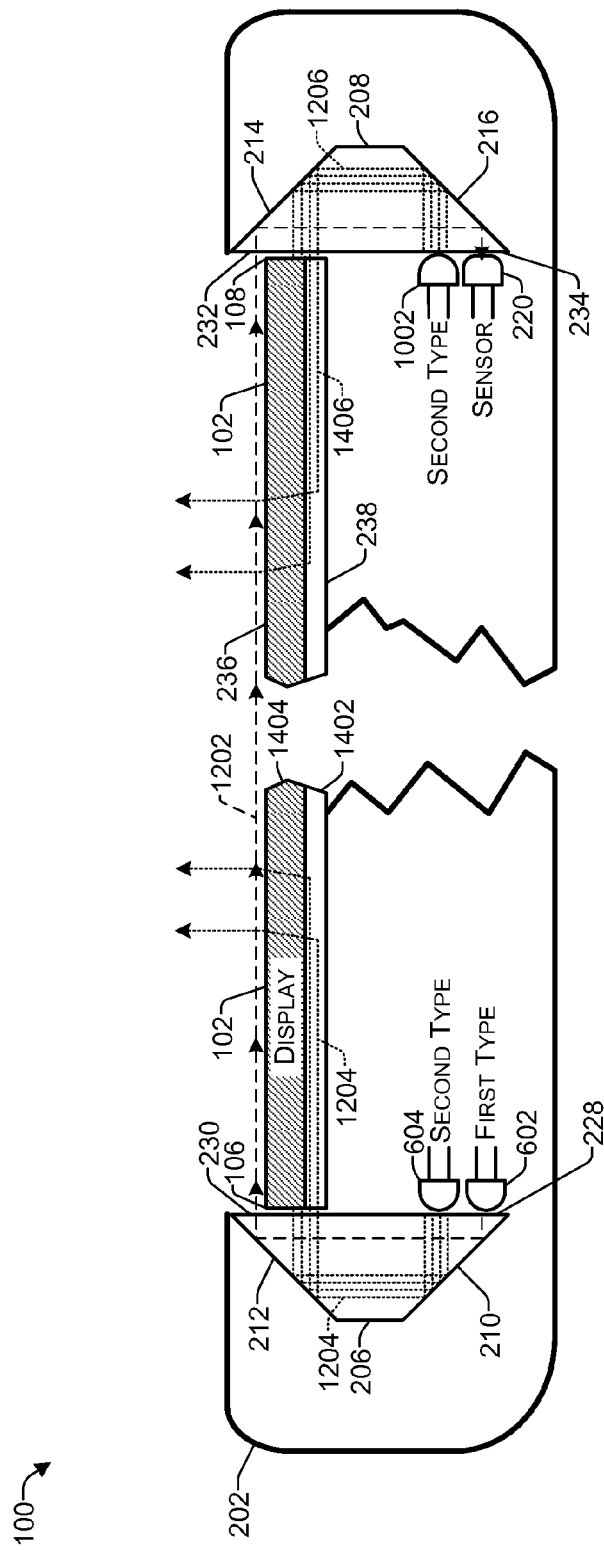
FIG. 14 illustrates a cross-section view according to some implementations of the example electronic device of FIG. 1, as taken along line 2-2 of FIG. 1.

FIG. 14 illustrates a cross-section view according to some implementations of the example electronic device 100 of FIG. 1, as taken along line 2-2 of FIG. 1. The implementation illustrated in FIG. 14, includes the first type of light source 602, and the second type of light sources 604, 1002, similar to the arrangement described above with respect to FIGS. 10-12. In the example of FIG. 14, the diffuser 204 is eliminated and the second type of light 1204, 1206 is directed into the display 102, such as into at least one of the right side 106 and/or the left side 108 of the display 102. For example, the display 102 may include a light-transmitting layer 1402 and an image-generation layer 1404. The first type of light 1202 may be directed across the display surface 236, as discussed above. Further, the second type of light 1204 may be directed into the light-transmitting layer 1402 and directed through the image-generation layer 1404 to provide backlighting illumination to the display 102. In some implementations, the display 102 may be an electrophoretic or other bi-stable display, as described herein, while in other implementations, the display 102 may be a liquid crystal display or other type of display that uses a backlight for visibility. Additionally, the light sources 602, 604, 1002 and light sensor 220 may be arranged in arrays similar to the arrangements described above with respect to FIGS. 4, 5 and 11, or in other suitable configurations, such as including the second type of light sources 604, 1002 along the top and/or bottom edges of the display. Accordingly, the amount of illumination provided to the display 102 from behind may be provided in a controllable manner as discussed above to enable a sufficient level of brightness, while also considering power consumption. In addition, any of the light sources, light sensors and light guide arrangements described in the examples above may be applied to the implementation of FIG. 14 as well for directing the second type of light into the display 102 rather than onto the display surface 236 or into the diffuser 204. For example, the dual-mode light source 218 may be used in place of the light sources 602, 604 and/or the light source 1002 may be eliminated in some implementations.

Further, while several examples of suitable light sources, sensors and light guide arrangements have been described herein, numerous other possible configurations will be apparent to those of skill in the art in view of the disclosure herein. Accordingly, implementations herein are not limited to the particular configurations described in the examples.

Example Electronic Device

Figure 15:
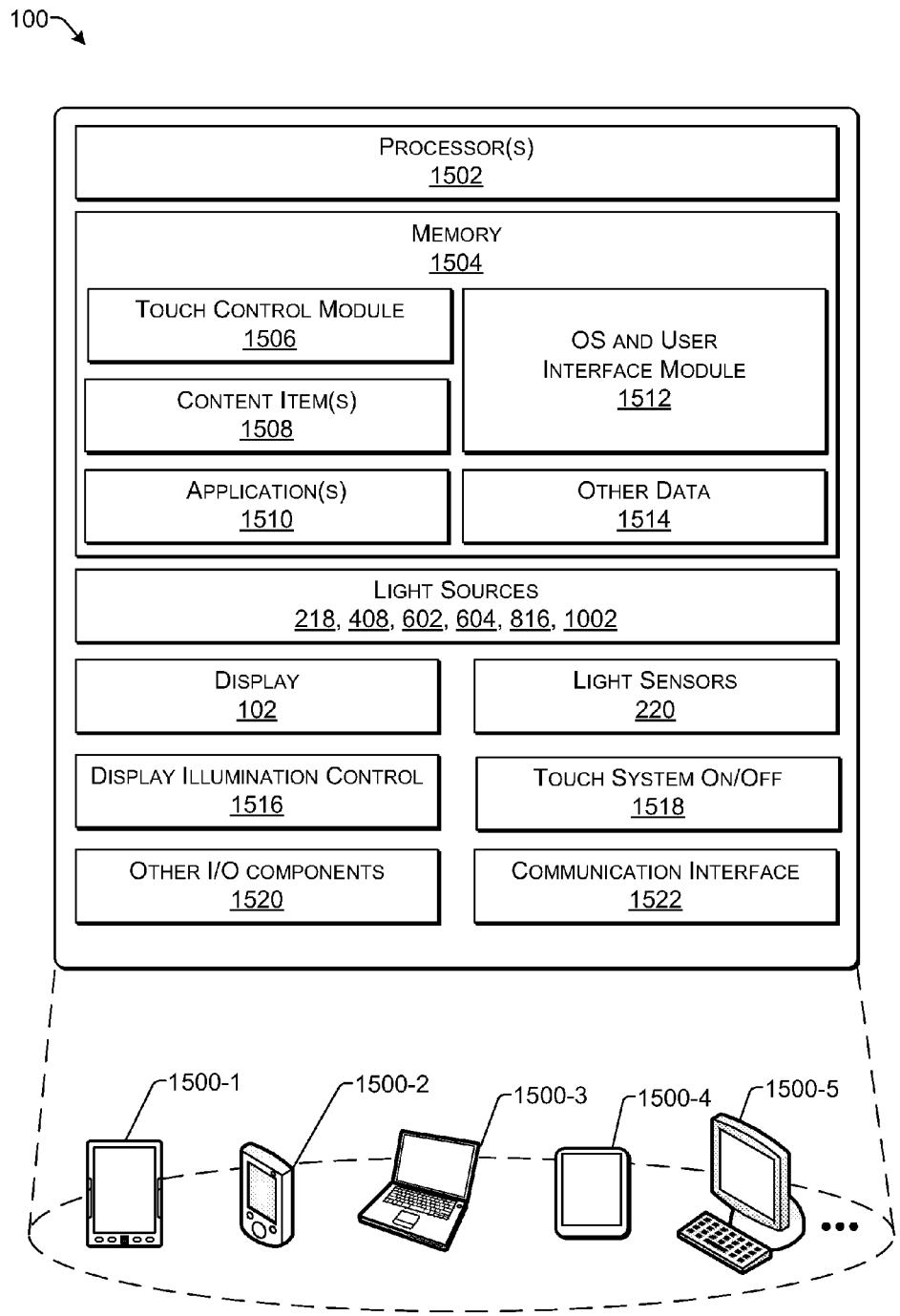
FIG. 15 is a block diagram illustrating selected example components of an electronic device according to some implementations.

FIG. 15 is a block diagram of select example components of the electronic device 100 according to some implementations. As mentioned above, the electronic device 100 may be any electronic device having a display. Several non-limiting examples of such devices may include eBook readers 1500-1, cellular phones and smart phones 1500-2, netbook and laptop computers 1500-3, tablet computing devices 1500-4, and personal computers 1500-5, as well as portable media players, navigation devices, kiosks, cash registers, appliances, gaming devices, kiosks, touch screen devices, computer peripherals, home electronics, robots, industrial equipment and machinery, and so forth. In a very basic configuration, the electronic device 100 includes or accesses components such as at least one processor 1502 and a memory 1504. Each processor 1502 may itself comprise one or more processors or cores. Depending on the configuration of the electronic device 100, the memory 1504 may be an example of non-transitory computer-readable media and may include volatile and nonvolatile memory, mass storage, removable storage, or the like. For instance, the memory 1504 may include, but is not limited to, RAM, ROM, EEPROM, flash memory, solid-state drives, memory cards, magnetic disks, optical disks, or other memory or storage technology. Thus, the memory 1504 may include any medium that can be used to store computer-readable instructions and data that can be accessed by the electronic device 100.

The memory may include a touch control module 1506 that includes functionality, executable instructions, control logic, or the like, for controlling the operation of the light-based touch control arrangement described herein. For example, the touch control module 1506 may be part of a light-based touch sensing system that receives input from one or more of the light sensors 220 for determining a location of a user's finger or other object in relation to the display 102 for enabling interaction with an image rendered on the display 102. For instance, the touch control module 1506 may include one or more algorithms that calculate the position of the user's finger dynamically in real-time in relation to information corresponding to a rendered image on the display for performing one or more functions provided by the electronic device 100. In some instances, the touch control module 1506 may calculate motion of user's finger, such as the direction of travel, speed of travel, predicted path of travel, and the like. In some implementations, the touch control module 1506 may also control the delivery of pulsed light as the first type of light from the light sources to the light sensors 220.

In addition, in some implementations, the touch control module 1506 may also control the provision of the second type of light as visible light to the display 102. For example, the touch control module 1506 may control how many light sources are active to provide visible light, which of the light sources of multiple light sources are active, or the like, based on activation of one or more controls by a user, a sensed ambient light condition, an image currently rendered on the display, or the like.

In some implementations, the memory 1504 may store any number of other functional components that are executable on the processor 1502, and may optionally include content items 1508, applications 1510, or the like, that can executed or rendered by the processor 1502 of the electronic device 100. The memory 1504 may also maintain an operating system (OS) and user interface module 1512 that is executable by the processor 1502. For example, the operating system may include a kernel operatively coupled to one or more device drivers and may provide a user interface for enabling a user to access functions and features of the electronic device 100. In some instances, the OS and user interface module 1512 may allow a user to select one or more of the content items 1508 for consumption on the electronic device 100, such as by displaying, playing, or the like. As another example, the OS and user interface module 1512 may provide menus and other navigational tools to facilitate interaction with the electronic device by a user. In some implementations, the OS and user interface module 1512 may enable operation of a browser or other application 1510 that facilitates access to sites over a network, such as websites, online merchants, etc.

The memory 1504 may also store other data 1514. Examples of other data 1514 may include executable programs, drivers and associated data, databases, user settings, configuration files, device status, user credentials, digital rights management information, and so forth. In some implementations, the memory 1504 may further include a memory portion designated as an immediate page memory (not shown) to temporarily store one or more pages of an electronic book or other content item 1508. In some instances, the pages held by the immediate page memory are placed therein a short period before a next page request is expected.

The electronic device 100 of FIG. 15 further includes one or more light sensors 220 and one or more of the light sources 218, 408, 602, 604, 816 and/or 1002 described above according to the various implementations. Furthermore, in some implementations, other types of light sources may be substituted for one or more of the light sources described herein. Accordingly, implementations herein are not limited to use with the examples of light sources described herein.

FIG. 15 further illustrates the display 102, which may be passive, emissive or any other form of display. As mentioned above, the display 102 may present content in a human-readable format to a user. In some implementations, the display 102 may include electrophoretic, pigmented electrophoretic, electrofluidic, interferometric, cholesteric liquid crystal, bi-stable LCDs, MEMS or other stable display technology that retains an image with no or little power applied to the display. In one implementation, the display 102 uses electronic paper or electronic ink display technology, which is bi-stable and enables the display 102 to maintain text or other rendered images with very little or no power. In other implementations, an active display such as a liquid crystal display may be used, and implementations herein may provide backlighting to the display, as described above with respect to FIG. 14. The display 102 may comprise drive electronics, such as a display drive matrix configured to affect individual pixels within the display 102. In some implementations, multiple displays 102 may be present on the electronic device 100. When multiple displays are present, these displays may be of the same or different types. For example, one display may be an electrophoretic display while another may be a liquid crystal display. For convenience only, the display 102 is shown in a generally rectangular configuration.

However, it is understood that the display 102 may be implemented in any shape, and may have any ratio of height to width.

FIG. 15 further illustrates that the electronic device 100 may include a display illumination control 1516 that can be activated by a user for controlling the visible light provided to the display 102. For example, the display illumination control 1516 may include one or more control buttons that a user may activate to control a level of light delivered to the display surface. In some implementations, the user may activate the display illumination control 1516 to provide power to one or more of the second type of light sources for providing visible light to at least a portion of the display 102. Additionally, or alternatively, the display illumination control 1516 may include a light sensor, or the like, that may sense ambient light conditions and provide the information to the touch control module 1506, the OS 1512, or other functional component that may automatically determine a suitable amount of visible light to deliver to the display 102.

Additionally, in some implementations, the electronic device may include a touch system on/off control 1518 that may allow a user to turn off and on the light-based touch sensing system described herein such as for conserving power of the device or the like. Accordingly, in some implementations, the display illumination lighting may be in a powered-on condition while the touch control system lighting is in a powered off condition, vice versa, or both the display illumination lighting and the touch control system lighting may be powered on and active contemporaneously.

In some implementations, the electronic device 100 may further be equipped with various other input/output (I/O) components 1520. Examples of other I/O components 1520 may include one or more audio speakers, various user actuable controls, (e.g., physical controls 126 discussed above), a microphone, a camera, connection ports, and so forth. For example, the operating system and user interface module 1512 of the electronic device 100 may include suitable drivers configured to accept input from a keypad, keyboard, or other user actuable controls and devices included as the I/O components 1520. In some implementations, the other I/O components 1520 may include page turning buttons, navigational keys, a power on/off button, selection keys, and so on. The other I/O components 1520 may further include various external controls and input devices such as a virtual or physical keyboard, a pointing stick, touchpad, a mouse, a trackball or joystick type mechanism, a docking station, and various other controls for performing various desired functions.

Additionally, in some implementations, the electronic device 100 may include a communication interface 1522. In some implementations, the communication interface may support wired and/or wireless connection to various networks, such as cellular networks, radio, WiFi networks, short-range or near-field networks (e.g., Bluetooth®), infrared signals, and so forth. The communication interface 1522 may allow a user of the electronic device 100 to download content items 1508 from a content item service, such as a from a website or other online service. The communication interface 1522 may further allow a user to access storage on another device, such as a user's computing device, a network attached storage (NAS) device, or the like.

The electronic device 100 may have additional features or functionality. For example, the electronic device 100 may also include various interfaces or ports supporting various protocols, a global positioning system (GPS) device, a PC Card component, a projector, peripheral components, and so forth.

Various instructions, methods and techniques described herein may be considered in the general context of computer-executable instructions, such as program modules stored on computer-readable media, such as memory 1504, and executed by the processor 1502. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Further, the example electronic device 100 illustrated in FIG. 15 is just one non-limiting example of a suitable electronic device according to some implementations. Numerous other implementations, variations and configurations will be apparent to those of skill in the art in view of the disclosure herein.

Example Process

Figure 16:
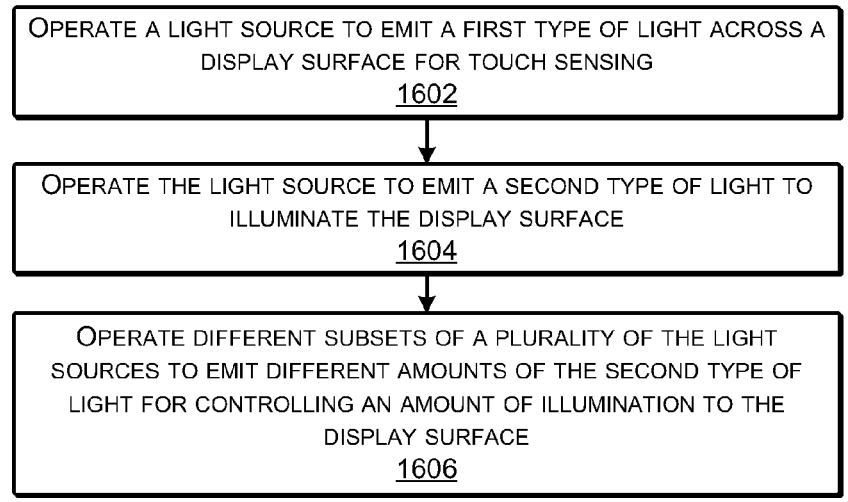
FIG. 16 is a flow diagram illustrating an example process of illuminating a display having light-based touch control according to some implementations.

FIG. 16 illustrates an example process 1600 for implementing some of the techniques described above for providing illumination to a display. This process is illustrated as a logical flow diagram, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process, and not all of the operations are necessarily required. The process 1600 is described with reference to the electronic device 100 of FIGS. 1-13, although other devices, architectures and systems may implement this process.

At block 1602, the electronic device operates a light source to emit a first type of light across a display surface for touch sensing. For example, the touch control module 1506 may control the emission and delivery of the first type of light. The first type of light is projected across the display surface to be detected by the light sensors 220 as part of the light-based touch sensing system.

At block 1604, the electronic device operates the light source to emit a second type of light to illuminate the display surface. For example, in response to user activation of a display illumination control or sensing of a low light condition, one or more light sources may be activated to produce the second type of light, which is directed to the display surface for illuminating the display.

At block 1606, the electronic device operates different subsets of a plurality of the light sources to emit different amounts of the second type of light for controlling an amount of illumination to the display surface. For example, different levels of illumination may be provided to the display surface based on user input or sensed lighting conditions by controlling which light sources of a plurality of light sources are energized to emit the second type of light. Other variations will also be apparent to those of skill in the art in view of the disclosure herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
a display for displaying an image, the display having a display surface and a bottom surface opposite to the display surface;
a first light guide located at a first side of the display, the first light guide having a first light passage positioned to receive light from at least one light source and a second light passage located above the display surface;
a second light guide located at a second side of the display, the second light guide having a first light passage located above the display surface opposed to the second light passage of the first light guide;
at least one light sensor positioned proximate to a second light passage of the second light guide;
the at least one light source operable to emit a first type of light into the first light passage of the first light guide, the first type of light exiting the second passage of the first light guide, radiating over the display to the first light passage of the second light guide for detection by the at least one light sensor to provide touch sensing in association with the display;
the at least one light source selectively operable to emit a second type of light that exits the second passage of the first light guide to illuminate the display surface, at least in part, with visible light; and
a diffuser extending over at least a portion of the display, the diffuser including a first end adjacent the second light passage of the first light guide and a second end, opposite the first end, adjacent the first light passage of the second light guide, the diffuser configured to:
receive the second type of light, exiting the second light passage, at the first end,
direct at least a portion of the second type of light received at the first end, in a direction substantially parallel to the display surface, to a location of the diffuser proximate the second end, and
direct the at least a portion of the second type of light to impinge upon the display,
the diffuser further including a top surface, and a bottom surface opposite the top surface and facing the display surface of the display, the diffuser being positioned such that, when the first type of light radiates over the display, the diffuser is disposed between the display surface and the first type of light radiating over the display,
wherein the display comprises a bi-stable display, the diffuser being configured to:
direct the at least a portion of the second type of light to exit the bottom surface of the diffuser,
receive, via the bottom surface, an amount of the second type of light reflected off of the display surface of the display, and
direct the amount of the second type of light to exit the top surface of the diffuser.

2. The device as recited in claim 1, wherein the at least one light source comprises a dual-mode light emitting diode operable to emit infrared light as the first type of light and operable to emit visible light as the second type of light.

3. The device as recited in claim 1, wherein the at least one light source comprises:
a first light emitting diode (LED) operable to emit the first type of light; and
a second LED operable to emit the second type of light, at least one of the first light source or the second light source located below the bottom of the display.

4. The device as recited in claim 1, wherein the at least one light source comprises an array of a plurality of the light sources extending along the first side of the display, at least some of the plurality of light sources operable to emit the first type of light and at least some of the plurality of light sources operable to emit the second type of light.

5. The device as recited in claim 1, further comprising a processor programmed by executable instructions to receive an input from the at least one light sensor indicative of a sensed display touch, and to determine a location of the sensed display touch, relative to an image displayed on the display, based at least in part on the input, wherein determining the location includes distinguishing between the first type of light and light received from a source external to the device.

6. A device comprising:
a display having a first side, a second side opposite the first side, and a display surface extending from the first side to the second side;
at least one light sensor;
at least one light source operable to emit a first type of light to radiate over the display for detection by the at least one light sensor;
the at least one light source operable to emit a second type of light to illuminate the display surface, at least in part, with visible light; and
a diffuser extending over at least a portion of the display surface, the diffuser including a first end proximate the first side of the display and a second end, opposite the first end, proximate the second side of the display, the diffuser configured to:
receive the second type of light at the first end,
direct at least a portion of the second type of light received at the first end to a location of the diffuser proximate the second end, and
direct the at least a portion of the second type of light to impinge upon the display,
the diffuser further including a top surface, and a bottom surface opposite the top surface and facing the display surface of the display, the diffuser being positioned such that, when the first type of light radiates over the display, the diffuser is disposed between the display surface and the first type of light radiating over the display,
wherein the display comprises a bi-stable display, the diffuser being configured to:
direct the at least a portion of the second type of light to exit the bottom surface of the diffuser,
receive, via the bottom surface, an amount of the second type of light reflected off of the display surface of the display, and
direct the amount of the second type of light to exit the top surface of the diffuser.

7. The device as recited in claim 6, wherein the first type of light is infrared light detectable by the at least one light sensor and the second type of light is visible light.

8. The device as recited in claim 6, wherein the first type of light is pulsed light emitted in a predetermined pattern detectable by the at least one light sensor and the second type of light is visible light emitted at a constant intensity.

9. The device as recited in claim 6, wherein the at least one light source comprises a dual-mode light emitting diode operable to:
emit the first type of light;
emit the second type of light; or
contemporaneously emit both the first type of light and the second type of light.

10. The device as recited in claim 6, wherein the at least one light source comprises:
a first light emitting diode (LED) operable to emit infrared light as the first type of light; and
a second LED operable to emit visible light as the second type of light.

11. The device as recited in claim 6, further comprising a first light guide positioned at a first side of the display, the first light guide having a first light passage positioned to receive light from the at least one light source and a second light passage positioned at least partially above the display surface to emit the light received from the at least one light source.

12. The device as recited in claim 11, further comprising a second light guide positioned at a second side of the display, the second light guide having a first light passage positioned at least partially above the display surface opposed to the second light passage of the first light guide for receiving the first type of light passing across the display surface, the second light guide including a second light passage for delivering the first type of light to the at least one light sensor.

13. The device as recited in claim 12, wherein the at least one light source comprises:
a first light emitting diode (LED) positioned to emit infrared light as the first type of light into the first light passage of the first light guide; and
a second LED positioned to emit visible light as the second type of light into the first light passage of the first light guide.

14. The device as recited in claim 13, further comprising a third LED positioned to emit visible light into the second light passage of the second light guide, the visible light from the third LED exiting from the first light passage of the second light guide to further illuminate at least a portion of the display surface.

15. The device as recited in claim 11, further comprising a recess formed in the first light guide below the second light passage of the first light guide, wherein the at least one light source comprises:
a first light emitting diode (LED) positioned to emit infrared light as the first type of light into the first light passage of the first light guide; and
a second LED positioned in the recess below the second light passage of the first light guide to emit visible light as the second type of light to illuminate the display surface, at least in part, with visible light.

16. A method comprising:
causing a light source to emit a first type of light into a first light passage of a first light guide, the first type of light exiting a second passage of the first light guide, passing across a display surface of a display for detection by at least one light sensor to provide touch sensing in association with the display, the display having a first side and a second side opposite the first side, the display surface extending from the first side to the second side;
receiving an input from the light sensor indicative of a sensed display touch;
selectively causing the light source to emit a second type of light, different from the first type of light, to illuminate the display surface, at least in part, with visible light;
directing the second type of light to exit the second passage of the first light guide and to enter a first end of a diffuser, the diffuser extending over at least a portion of the display surface and including a first end adjacent the second light passage of the first light guide, and a second end, opposite the first end, proximate the second side of the display;
directing at least a portion of the second type of light entering the first end to a location of the diffuser proximate the second end, and
directing the at least a portion of the second type of light to impinge upon the display,
the diffuser further including a top surface, and a bottom surface opposite the top surface and facing the display surface of the display, the diffuser being positioned such that, when the first type of light radiates over the display, the diffuser is disposed between the display surface and the first type of light radiating over the display,
wherein the display comprises a bi-stable display, the diffuser being configured to:
direct the at least a portion of the second type of light to exit the bottom surface of the diffuser,
receive, via the bottom surface, an amount of the second type of light reflected off of the display surface of the display, and
direct the amount of the second type of light to exit the top surface of the diffuser.

17. The method as recited in claim 16, wherein the first light guide is disposed on the first side of the display, the method further comprising:
directing the first type of light passing across the display surface to a second light guide disposed on the second side of the display, the diffuser being disposed between the display surface and the first type of light passing across the display surface; and
directing, with the diffuser, at least a portion of the first type of light in a direction substantially parallel to the display surface as the at least a portion of the first type of light passes from the first end to the location.

18. The method as recited in claim 16, further comprising:
causing the light source to emit pulsed light in a predetermined pattern of a plurality of pulses detectable by a light sensor as the first type of light; and
causing the light source to emit visible light at a constant intensity as the second type of light.

19. The method as recited in claim 16, further comprising:
distributing a plurality of the light sources along a side of the display; and
controlling an amount of illumination provided to the display surface by selectively operating a subset of the light sources to emit the second type of light.

20. The method as recited in claim 19, further comprising providing a control that is selectively actuable by a user to control the amount of illumination, actuation of the control multiple times causing different subsets of the plurality of light sources to emit the second type of light.

21. A device comprising:
a display having a display surface;
at least one light sensor;
a first light emitting diode (LED) operable to emit infrared light;
a second LED operable to emit visible light;
a light guide positioned at a first side of the display, the light guide having a first light passage positioned to receive the infrared light from the first LED and the visible light from the second LED, the light guide having a second light passage positioned at least partially above the display surface to emit the infrared light to pass across the display surface to a second side of the display for detection by the at least one light sensor to provide touch sensing in association with the display, the second light passage further positioned to emit the visible light to illuminate the display, at least in part, with visible light; and a diffuser extending over at least a portion of the display surface, the diffuser including a first end adjacent the second light passage and a second end, opposite the first end, proximate the second side of the display, the diffuser configured to:
  receive the visible light, from the second light passage, at the first end,
  direct at least a portion of the visible light received at the first end to a location of the diffuser proximate the second end, and
  direct the at least a portion of the visible light to impinge upon the display,
  the diffuser further including a top surface, and a bottom surface opposite the top surface and facing the display surface of the display, the diffuser being positioned such that, when the first type of light radiates over the display, the diffuser is disposed between the display surface and the first type of light radiating over the display,
  wherein the display comprises a bi-stable display, the diffuser being configured to:
  direct the at least a portion of the second type of light to exit the bottom surface of the diffuser,
  receive, via the bottom surface, an amount of the second type of light reflected off of the display surface of the display, and
  direct the amount of the second type of light to exit the top surface of the diffuser.

22. The device as recited in claim 21, wherein the diffuser is configured to direct the at least a portion of the visible light in a direction substantially parallel to the display surface as the at least a portion of the visible light passes from the first end to the location.

23. The device as recited in claim 22, wherein the second LED is positioned with respect to the first light passage and the entry end of the diffuser is position with respect to the second light passage such that the visible light from the second LED is predominantly projected into the entry end of the diffuser.

24. The device as recited in claim 21, wherein the infrared light is emitted as a pulse of light emitted in a predetermined pattern detectable by the at least one light sensor and the visible light emitted at a constant intensity.

25. The device as recited in claim 21, wherein there are a plurality of the first LEDs and a plurality of the second LEDs arranged in an array distributed along the first side of the display, the device further comprising a control for selectively operating a subset of the plurality of second LEDs to control an amount of illumination to the display surface.

26. The device as recited in claim 21, wherein the visible light is directed into a light-transmission layer of the display to illuminate an image-generation layer of the display from behind.

27. The device as recited in claim 21, wherein the visible light is directed onto a display surface of the display.

* * * * *